(12) United States Patent
Gutelius et al.

(10) Patent No.: US 9,879,739 B2
(45) Date of Patent: Jan. 30, 2018

(54) ELECTRIC PARK BRAKE FOR A MULTIPLE PISTON CALIPER

(71) Applicant: Akebono Brake Industry Co., Ltd, Chuo-Ku, Tokyo (JP)

(72) Inventors: Kenneth Eric Gutelius, Lake Orion, MI (US); Galus Chelaidite, South Lyon, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 0 days.

(21) Appl. No.: 15/140,689

(22) Filed: Apr. 28, 2016

(65) Prior Publication Data

US 2016/0238094 A1    Aug. 18, 2016

Related U.S. Application Data

(63) Continuation of application No. 14/529,739, filed on Oct. 31, 2014, now Pat. No. 9,353,811.
(Continued)

(51) Int. Cl.
*F16D 65/18* (2006.01)
*F16D 65/00* (2006.01)
(Continued)

(52) U.S. Cl.
CPC ....... *F16D 65/0068* (2013.01); *F16D 55/225* (2013.01); *F16D 65/14* (2013.01);
(Continued)

(58) Field of Classification Search
CPC ...... F16D 55/2255; F16D 65/14; F16D 65/18; F16D 65/183; F16D 2055/0091;
(Continued)

(56) References Cited

U.S. PATENT DOCUMENTS

| 4,804,073 A | 2/1989 | Taig et al. |
| 4,809,824 A | 3/1989 | Bendix |

(Continued)

FOREIGN PATENT DOCUMENTS

| EP | 1607297 A1 | 12/2005 |
| EP | 2878849 A2 | 6/2015 |

(Continued)

OTHER PUBLICATIONS

Extended European Search Report dated Jul. 6, 2015 for Application No. 14192700.4.

*Primary Examiner* — Thomas Irvin
(74) *Attorney, Agent, or Firm* — The Dobrusin Law Firm, P.C.

(57) ABSTRACT

A brake system comprising: (a) a body assembly comprising: (i) an outboard side, (ii) an inboard side, (iii) a bridge extending between and connecting the inboard side and the outboard side, and (iv) two or more piston assemblies located entirely on the outboard side, entirely on the inboard side, or located both on the inboard side and the outboard side; and (b) an electric brake assembly comprising: (i) one or more differential assemblies in communication with the body assembly and each of the two or more piston assemblies; wherein the one or more differential assemblies provide power equally to each of the two or more piston assemblies so that each of the piston assemblies are moved axially in unison until a resistance of one of the two or more piston assemblies becomes higher than a remainder of the two or more piston assemblies and the one or more differential assemblies transfer power from the piston assembly with the higher resistance to the remainder of piston assemblies with a lower resistance so that the piston assembly with the higher resistance ceases to move and additional power is supplied to the remainder of the piston assemblies.

20 Claims, 8 Drawing Sheets

Related U.S. Application Data (60) Provisional application No. 61/903,567, filed on Nov. 13, 2013.

(51) Int. Cl.

| | | |
|---|---|---|
| *F16D 55/225* | (2006.01) | |
| *F16D 65/14* | (2006.01) | |
| F16D 55/00 | (2006.01) | |
| F16D 121/24 | (2012.01) | |
| F16H 48/08 | (2006.01) | |
| F16D 125/40 | (2012.01) | |
| F16D 125/20 | (2012.01) | |
| F16D 125/24 | (2012.01) | |
| F16D 57/00 | (2006.01) | |
| F16D 121/02 | (2012.01) | |
| F16D 123/00 | (2012.01) | |
| F16D 125/46 | (2012.01) | |
| F16D 125/48 | (2012.01) | |

(52) U.S. Cl.
CPC ............ *F16D 65/18* (2013.01); *F16D 57/002* (2013.01); *F16D 65/183* (2013.01); *F16D 2055/0016* (2013.01); *F16D 2055/0091* (2013.01); *F16D 2121/02* (2013.01); *F16D 2121/24* (2013.01); *F16D 2123/00* (2013.01); *F16D 2125/20* (2013.01); *F16D 2125/24* (2013.01); *F16D 2125/40* (2013.01); *F16D 2125/46* (2013.01); *F16D 2125/48* (2013.01); *F16H 48/08* (2013.01)

(58) Field of Classification Search
CPC ............ F16D 2121/24; F16D 2125/20; F16D 2125/40; F16D 2125/48
USPC ...................................... 188/72.3, 72.6, 72.4
See application file for complete search history.

(56) References Cited

U.S. PATENT DOCUMENTS

| | | | |
|---|---|---|---|
| 5,090,518 A | | 2/1992 | Schenk et al. |
| 5,107,967 A | * | 4/1992 | Fujita .................... B60T 1/065 188/156 |
| 5,148,894 A | | 9/1992 | Eddy, Jr. |
| 5,348,123 A | | 9/1994 | Takahashi et al. |
| 5,769,189 A | | 6/1998 | Heibel et al. |
| 6,098,763 A | | 8/2000 | Holding |
| 6,139,460 A | | 10/2000 | Drennen et al. |
| 6,173,820 B1 | | 1/2001 | Blosch et al. |
| 6,179,097 B1 | | 1/2001 | Schumann |
| 6,189,661 B1 | | 2/2001 | Schaffer |
| 6,279,690 B1 | | 8/2001 | Schaffer |
| 6,279,691 B1 | | 8/2001 | Takahashi et al. |
| 6,315,092 B1 | | 11/2001 | Schwarz |
| 6,367,593 B1 | | 4/2002 | Siler et al. |
| 6,390,247 B1 | | 5/2002 | Drennen |
| 6,401,879 B1 | | 6/2002 | Drennen et al. |
| 6,412,610 B1 | | 7/2002 | Drennen et al. |
| 6,435,320 B1 | | 8/2002 | Drennen et al. |
| 6,554,109 B1 | | 4/2003 | Olschewski et al. |
| 6,561,321 B1 | | 5/2003 | Klode et al. |
| 6,626,270 B2 | | 9/2003 | Drennen et al. |
| 6,889,800 B2 | | 5/2005 | Halasy-Wimmer et al. |
| 6,915,883 B2 | | 7/2005 | Watanabe et al. |
| 7,188,710 B2 | | 3/2007 | Reuter et al. |
| 7,219,772 B2 | | 5/2007 | Bieker et al. |
| 7,328,777 B2 | * | 2/2008 | Han ........................ F16D 65/18 188/156 |
| 7,490,703 B2 | | 2/2009 | Maehara |
| 7,721,853 B2 | | 5/2010 | Chittka |
| 7,942,247 B2 | | 5/2011 | Adachi et al. |
| 8,181,750 B2 | | 5/2012 | Homma et al. |
| 8,684,147 B2 | * | 4/2014 | Winkler .............. F16H 25/2238 188/156 |
| 8,794,720 B2 | * | 8/2014 | Schumann ............. B60T 7/108 303/174 |
| 8,875,851 B2 | * | 11/2014 | Winkler .................. F16D 65/18 188/106 F |
| 9,145,950 B2 | | 9/2015 | Dettenberger et al. |
| 9,180,841 B2 | * | 11/2015 | Suzuki .................... B60T 1/065 |
| 9,180,844 B2 | | 11/2015 | Murata et al. |
| 9,188,182 B2 | | 11/2015 | Park et al. |
| 9,587,692 B2 | * | 3/2017 | Gutelius ................. F16D 65/18 |
| 2003/0042084 A1 | | 3/2003 | Kawase et al. |
| 2004/0045776 A1 | | 3/2004 | Baumgartner et al. |
| 2004/0168867 A1 | | 9/2004 | Kerscher et al. |
| 2006/0124406 A1 | | 6/2006 | Baumgartner |
| 2009/0294224 A1 | | 12/2009 | Sakashita |
| 2014/0034432 A1 | | 2/2014 | Bull |
| 2015/0129371 A1 | | 5/2015 | Gutelius et al. |
| 2015/0144438 A1 | | 5/2015 | Park et al. |
| 2015/0151052 A1 | | 6/2015 | Stroumpoulis et al. |
| 2015/0204402 A1 | | 7/2015 | Gutelius |
| 2015/0354650 A1 | | 12/2015 | Bull |
| 2015/0354651 A1 | | 12/2015 | Park et al. |
| 2015/0362031 A1 | | 12/2015 | Kong et al. |
| 2016/0001794 A1 | | 1/2016 | Gibney et al. |
| 2016/0017942 A1 | | 1/2016 | Kwon et al. |
| 2017/0058979 A1 | * | 3/2017 | Bahmata ................. F16D 65/18 |

FOREIGN PATENT DOCUMENTS

| | | |
|---|---|---|
| JP | 2009052682 A | 3/2009 |
| WO | 2000/037819 A1 | 6/2000 |
| WO | 2013/121395 A1 | 8/2013 |

* cited by examiner

ELECTRIC PARK BRAKE FOR A MULTIPLE PISTON CALIPER

FIELD

The present teachings relate to an electric brake that is used in conjunction with an existing brake system having multiple pistons so that the pistons are actuated and the brake system is used as a parking brake.

BACKGROUND

The present teachings are predicated upon providing an improved parking brake for use in an existing disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, wind turbines, or the like. However, the present teachings are most suitable for use with a passenger vehicle (e.g., a car, truck, sports utility vehicle, or the like).

Generally, a braking system includes a rotor, a caliper body, a support bracket, an inboard brake pad, and an outboard brake pad that are on opposing sides of the rotor. The caliper body further includes one or more fingers (with or without a piston), one or more piston bores, and a bridge that connects the one or more fingers to the piston bores or two opposing piston bores together. The piston bores each house a piston. The piston bores each have a bore axis that the pistons move along during a brake apply and a brake retract. The piston bores each include a fluid inlet, a closed wall, a front opening, and a cylindrical side wall that includes a seal groove located near the front opening. Typically, the fluid inlet is located in the closed wall of the piston bore so that when pressure is applied the fluid will flow into the piston bore. During a pressure apply the fluid will push the piston axially towards the front opening and into contact with a brake pad that generally includes a pressure plate and friction material and the friction material will contact the rotor on one side and an opposing brake pad will contact the rotor on an opposing side creating friction to stop rotation of the rotor and any component connected to the brake system. The brake pads may slide on an abutment along an axis of the pistons or the brake pads may include holes that receive pins and the brake pads may slide on pins that extend through the brake system so that a friction force may be created.

In these non-braking conditions when the vehicle is parked a parking brake may be used to prevent movement of the vehicle. The parking brake may be a discrete braking system or may use one or more components of a primary braking system. Parking brake systems typically include one or more brake pads and/or brake shoes that may be moved to create a parking force so that the vehicle is restrained during non-movement of a vehicle. These parking brake systems may be actuated by a cable that when moved biases a device that simultaneously actuates the brake pads and/or brake shoes to generate the parking force.

Examples of braking systems and associated parking brake systems are disclosed in U.S. Pat. Nos. 5,148,894; 5,769,189; 6,098,763; 6,139,460; 7,188,710; and U.S. International Application Publication No. WO2013/121395 all of which are expressly incorporated herein by reference for all purposes. It would be attractive to have a parking brake system that may be used with a fixed caliper, a floating caliper, or both. It would be attractive to have a parking brake system that may be used with a multi piston system to actuate the multiple pistons to create a parking brake force. What is needed is a parking brake system that utilizes existing brake components to create a braking force when the brake is at rest. What is needed is a brake system that evenly applies a braking force between multiple pistons of a brake component so that braking force is equally distributed along the brake component.

SUMMARY

The present teachings provide: a brake system comprising: (a) a body assembly comprising: (i) an outboard side, (ii) an inboard side, (iii) a bridge extending between and connecting the inboard side and the outboard side, and (iv) two or more piston assemblies located entirely on the outboard side, entirely on the inboard side, or located both on the inboard side and the outboard side; and (b) an electric brake assembly comprising: (i) one or more differential assemblies in communication with the body assembly and each of the two or more piston assemblies; wherein the one or more differential assemblies provide power equally to each of the two or more piston assemblies so that each of the piston assemblies are moved axially in unison until a resistance of one of the two or more piston assemblies becomes higher than a remainder of the two or more piston assemblies and the one or more differential assemblies transfer power from the piston assembly with the higher resistance to the remainder of piston assemblies with a lower resistance so that the piston assembly with the higher resistance ceases to move and additional power is supplied to the remainder of the piston assemblies.

One possible example of the present teachings include: a fixed brake comprising: (a) a body assembly comprising: (i) an outboard side including a piston assembly; (ii) an inboard side including a piston assembly; and (iii) a bridge extending between and connecting the piston assembly on the outboard side to the piston assembly on the inboard side, wherein the bridge includes a bridge bore that extends between the inboard side and the outboard side; (b) one or more gear clusters in communication with the body assembly; and (c) one or more differential assemblies in communication with the body assembly and the one or more gear clusters; wherein one or more shafts extend through the bridge bore and connect the piston assembly on the inboard side and the piston assembly on the outboard side to the one or more gear clusters and the one or more differential assemblies so that movement of all or a portion of the one or more differential assemblies actuates the piston assembly on the inboard side and the piston assembly on the outboard side individually, in unison, or a combination of both to create a brake force.

One possible embodiment of the present teachings include: fixed brake comprising: (a) a body assembly comprising: (i) an outboard side including a piston assembly; (ii) an inboard side including a piston assembly; (iii) a bridge extending between and connecting the piston assembly on the outboard side to the piston assembly on the inboard side, and (iv) a bridge bore extending through the bridge and between the inboard side and the outboard side; wherein the piston assembly on the outboard side and the piston assembly on the inboard side both include: a piston bore that houses: (1) a piston, (2) a drive screw in communication with the piston, (3) a drive gear in communication with the drive screw, and (4) a bearing connected to the piston bore and the drive gear so that the drive gear rotates about an axis of the drive screw and moves the drive screw along the axis of the drive screw; (b) a gear cluster connected to the body assembly, wherein the gear cluster includes: (i) an outer drive gear and (ii) one or more shafts (c) a differential assembly connected to the body assembly via the one or more gear clusters, wherein the differential assembly includes: (i) an outboard side gear, (ii) an inboard side gear, and (iii) a plurality of pinion gears extending between and connecting the outboard side gear to the inboard side gear; wherein the plurality of pinion gears rotate about their respective axis when the inboard side gear and the outboard side gear move independently, and wherein the plurality of pinion gears are substantially free of rotation about their respective axis when the inboard side gear and the outboard side gear move in unison and the plurality of pinion gears move with the outboard side gear and the inboard side gear; (d) a motor connected to the differential assembly, the motor rotating the inboard side gear, the outboard side gear, or both; wherein the outboard side gear, the inboard side gear, or both is in communication with the outer drive gear and the outer drive gear actuates the piston assembly on the inboard side wherein the one or more shafts extend from the gear cluster through the bridge bore and connect the piston assembly on the outboard side to the gear cluster so that movement of the inboard side gear, the outboard side gear, or both actuates the piston assembly on the outboard side; and wherein the differential assembly permits the piston assembly in the inboard side and the piston assembly on the outboard side to move in unison, independently, or both.

The present teachings provide a parking brake system that may be used with a fixed caliper, a floating caliper, or both. The present teachings provide a parking brake system that may be used with a multi piston system to actuate the multiple pistons to create a parking brake force. The present teachings provide a parking brake system that utilizes existing brake components to create a braking force when the brake is at rest. The present teachings provide a brake system that evenly applies a braking force between multiple pistons of a brake component so that braking force is equally distributed along the brake component.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings claim priority to U.S. Provisional Patent Application No. 61/903,567 filed on Nov. 13, 2013, the contents of which are expressly incorporated by reference herein in its entirety for all purposes and especially the claims as originally filed. The teachings herein provide a brake system. The brake system may function to provide a friction force such as a braking force, a parking brake force, a stopping force, or a combination thereof. The brake system may create a braking force, which is a force that stops rotation of a rotor, a stops movement of a vehicle, or both. The brake system may create a parking force, which is a force that prevents rotation of a rotor, movement of the vehicle, or both when the vehicle is in a stopped position or in an emergency situation. The brake system may be a pneumatic brake system, an electrical brake system, a hydraulic brake system, or a combination thereof. Preferably, the brake system is a combination hydraulic system and electric system. More preferably, the brake system is hydraulic in one phase and electric in a different phase. The electric brake system may use one or more electric motors to actuate the brake pads. For example, the hydraulic brake system may actuate the brake pads during standard braking operation and the electric brake system may actuate the brakes upon parking and/or maintaining the brake system in a stopped configuration. The brake system may be an opposing brake system (i.e., a fixed caliper brake system) or a floating brake system (i.e., a floating caliper). The brake system may include one or more brake pads, one or more pistons and preferably one or more opposing pistons, two or more adjacent pistons more side by side pistons, one or more rotors, one or more brake assemblies, or a combination thereof.

The one or more brake pads may function to create a friction force (e.g., a stopping force, a parking force, a braking force, or a combination thereof) when moved into contact with another member (e.g., a rotor, drum, or the like). The one or more brake pads may include one or more portions that assist in creating a friction force. The one or more brake pads may include a pressure plate and friction material. The one or more brake pads may be opposing brake pads. The one or more brake pads may contact opposing sides of the member body assembly) during a friction force.

For example, the brake pads may contact opposing pistons, or two or more adjacent pistons and one or more opposing fingers. All or a portion of the brake pads may be moved to create a parking brake force. For example, if there are multiple pistons on each side of the body assembly, rotor, or both a single piston on each side of the rotor may be actuated pushing a portion of the brake pad into contact with the rotor so that a parking brake force is created.

The rotor may function to assist in creating a friction force. The rotor may extend between two or more opposing brake pads so that one or more brake pads contact each side of the rotor to create a friction force. The rotor may be generally circular and may extend through a body assembly, be connected to a body assembly, be partially surrounded by a body assembly, or a combination thereof. Preferably, the rotor extends through the body assembly (e.g., a caliper) so that an inboard brake pad extends along an inboard face of the rotor and an outboard brake pad extends along an outboard face of the rotor.

The body assembly may function to move two or more brake pads into contact with a rotor to create a friction force. The body assembly may move during a brake apply (i.e., be a floating caliper). The body assembly may be connected to two or more opposing surfaces, pins, or both and may slide upon the two or more opposing surfaces, pins, or both so that a friction force is created. The body assembly may be movable connected to a support bracket. The body assembly may be directly connected to a knuckle or support structure. Preferably, the body assembly is fixed so that a body of the body assembly does not move to create a friction force a fixed caliper). The body assembly may include an inboard side and an outboard side that are connected by a bridge extending there between. The inboard side, outboard side, or both may include one or more of the following: one or more pistons, one or more fingers, two or more pistons, or two or more fingers. The inboard side may be located on an inside of a body of a vehicle and be free of exposure to an area around a vehicle and an outboard side may face an area on an outside of a vehicle.

The one or more bridges may function to connect an inboard side to an outboard side of the body assembly. The bridges may have a portion that connects to another device (e.g., a support structure), a knuckle, or both. The bridges may extend over a gap, a rotor, one or more brake pads, one or more piston assemblies, one or more piston bores, or a combination thereof. The bridges may connect ends of the body assembly together (i.e., there are 2 bridges). For example, the bridges may extend between an inboard side and an outboard side of a body assembly at opposing ends of each side of the body assembly. Preferably, the bridge connects an inboard piston assembly to an outboard piston assembly. The bridge may connect one or more piston assemblies and preferably two or more piston assemblies to opposing fingers. The bridge may include one or more bridge bores that extend through the bridge, adjacent to the bridge, or a combination of both between an inboard side and an outboard side.

The one or more bridge bores may function to connect an inboard side of the body assembly to an outboard side of the body assembly. The bridge bore may allow one or more devices to extend between an inboard side and an outboard side, between an inboard piston assembly and an outboard piston assembly, or both. The bridge bore may function to allow one or more devices to extend through the bridge bore between an inboard side and an outboard side. The one or more bridge bores may extend through a central portion of the bridge, an end of the bridge, or both. The bridge bore may be any size and shape so that one or more shafts, one or more connection devices, one or more driving devices, or a combination thereof may extend through the bridge bore. The bridge bore may be substantially linear and extend through the bridge. The bridge bore may be a generally continuous arc that extends from an inboard side to an outboard side. The bridge bore may include one or more straight sections, one or more curved sections, or both. The bridge bore may have a substantially continuous cross-sectional length (e.g., diameter), may have a varied cross-sectional length, or both. The bridge bore may extend between two or more piston assemblies.

The one or more piston assemblies may function to move one or more brake pads, create a friction force, or both. All or a portion of the one or more piston assemblies may function to move forward and backward along an axis (i.e., axially in and out of the piston bores) so that one or more brake pads create a friction force and are released from creating a friction force. The one or more piston assemblies may be moved hydraulically, pneumatically, electrically, or a combination thereof to create a brake apply, a parking brake apply, or both. Preferably, the one or more piston assemblies create a braking force using one method of moving the brake pads and the piston assemblies create a parking force using a different method of moving the brake pads. For example, the braking force may be created by the piston assembly creating a hydraulic force to move the brake pads, and the parking force may be creating by the piston assembly electrically moving the brake pads. The piston assembly may include at least a piston and a piston bore and the piston may extend along an axis of the piston bore.

The two or more piston bores may function to each house one or more pistons, one or more components that move a piston, all or a portion of a piston assembly, or a combination thereof. The piston bore may connect a piston assembly to a bridge, a body assembly, or both. One or more piston bores may be located on the inboard side and the outboard side of the body assembly. Two or more piston bores may be located on the inboard side or the outboard side only of the body assembly. Two or more piston bores may be located on both the inboard side and the outboard side of the body assembly. The piston bore may include a closed side and an open side. The closed side may be walls that are located on the outside of the piston assembly and the open side may be centrally located so that the pistons may be moved from the piston bores towards each other, a brake pad, a rotor, or a combination thereof. The piston bores may be located adjacent, opposed, side by side, or a combination thereof. Each of the piston bores include a piston bore axis. When one or more opposing pistons are used, each of the axes of the piston bores are generally aligned, generally parallel, or both. The one or more piston bores may include a piston assembly. The one or more components that each piston bore may include are one or more bearings, one or more drive screws, one or more drive gears, one or more pistons, a fluid, one or more seals, or a combination thereof.

The one or more piston assemblies may function to create a braking force, a parking brake force, or both. The one or more piston assemblies may reside entirely and/or partially within a piston bore. The one or more piston assemblies may function to actuate the two or more pistons hydraulically, electrically, pneumatically, or a combination of two or more ways. Each of the piston assemblies may include a piston, a drive screw, or both. The drive screw may include an elongated portion and a pushing portion that extend into a piston of the piston assembly.

The one or more pistons may function to move in and out of a piston bore to create a friction force. The one or more pistons may move along an axis, the piston bore axis, or both. The one or more pistons may function to move one or more brake pads. The one or more pistons may seal the piston bore so that a fluid is trapped within the piston bore, the piston, or both. The one or more pistons may have sufficient strength so that the one or more pistons may be moved by a fluid, moved by air, moved by an electrical device, or a combination thereof to create a friction force. The one or more pistons may seal the open side of the piston so that a fluid, an actuation device, or both is sealed within the piston bore. The actuation device may include one or more components that move the piston. The piston during creation of a friction force may be moved by a fluid, a drive screw, a drive gear, or a combination thereof.

The one or more drive screws may function to move one or more pistons to create a friction force. The one or more drive screws may move along an axis of the drive screw, an axis of the piston, an axis of the piston bore, or a combination thereof. The one or more drive screws may be any configuration that an electric motor, a hydraulic device, a pneumatic device, a linear actuator, a stepper motor, or a combination thereof may move the drive screw along an axis to create a friction force. The one or more drive screws may function to contact a rear side of a piston and axially move the piston and an associated brake pad into contact with a rotor, towards an opposing brake pad and/or piston, or both. The one or more drive screws may function to be moved in any manner so that the drive screws contact a piston and axially move the piston to create a braking force, a parking force, or both. The one or more drive screws may include one or more threads that assist in axially moving the drive screw. The one or more drive screws may include threads that helically wrap around the drive screws and axially move the drive screws in and out of the piston bore. The drive screw may include one or more gears, one or more geared portions, or both on the elongated portion so that the drive screw may be axially moved. The one or more drive screws may be made of any material that is resistant to a fluid and in particular brake fluid. The one or more drive screws may be made of plastic, a phenolic resin, a metal (e.g., steel, stainless steel, aluminum, or a combination thereof), a polymer, or a combination thereof. The one or more drive screws may be substantially solid. Preferably, the one or more drive screws may include one or more apertures and preferably a plurality of apertures for a fluid to pass through the drive screw and into contact with a back side of the piston so that the fluid moves the piston to create a friction force. The plurality of apertures may be located within a pushing portion. The one or more drive screws may include a pushing portion and an elongated portion.

The pushing portion may function to contact the piston and move the piston to a braking position, to create a friction force. The pushing portion may allow fluid to pass through so that a hydraulic braking force may be created. The pushing portion may function to evenly distribute pressure across a face of a piston so that an even distribution of force is applied on the brake pads. The pushing portion may be generally planar. The pushing portion may be porous, include apertures, include through holes, or a combination thereof. The pushing portion may have a hub and spoke configuration. The pushing portion may have a shape that mirrors the shape of the piston. The pushing portion may be substantially perpendicular to the piston bore axis. The pushing portion may be movably connected or rigidly connected to the elongated portion.

The elongated portion may function to move the pushing portion along an axis to move the piston. The elongated portion may be in communication with a component that moves the drive screw axially. The elongated portion may be threaded, may include one or more axial driving features, steps, ratchet features, apertures, recesses, or a combination thereof. The elongated portion may be rotated relative to the pushing portion. Preferably, the elongated portion and the pushing portion may move as one unit. The one or more drive screws may be rotated about an axis and as the one or more drive screws rotate the drive screw may extend along an axis. Preferably, the one or more drive screws remain substantially static and one or more components (e.g., drive gears) rotate about the drive screw to axially advance the drive screw. The drive gears and the drive screws may both be rotationally static. The drive gears may include gears and/or teeth that axially move the elongate portion. More preferably, a drive gear may rotate around the drive screw and move the drive screw axially towards and away from the piston so that a friction force is created.

The one or more drive gears may function to actuate one or more drive screws, one or more pistons, or both axially so that a friction force is created. The one or more drive gears may function to axially move one or more drive screws along a piston bore axis, a drive screw axis, a piston axis, or both. The one or more drive screws may substantially surround a portion of the drive screw. Preferably, the one or more drive gears surround all or a portion of an elongated portion of the drive screw so that as the drive gear rotates the drive screw is axially moved through the drive gear. The drive gear may include a portion that extends into the elongated portion of the drive screw so that as the drive gear is rotated the drive screw is axially moved. The drive gear may include one or more gears, one or more geared portions, or both for rotating the drive gear, the drive screw, or both so that the drive screw is axially moved. The one or more drive gears may multiply torque from the motor, provide an adequate force, or both so that the piston is moved to create a parking force. The one or more drive gears may increase the torque of a high speed motor so that a parking force is rapidly created. The drive gear and drive screw may have a connection so that one rotation of the drive gear axially moves the drive screw 1 mm or more, 2 mm or more, 5 mm or more, or even 10 mm or more. The drive gear may fully actuate the drive screw in about 5 seconds or less, preferably about 3 seconds or less, more preferably about 2 seconds or less, or even more preferably about 1.5 seconds or less so that a parking brake force is created. The drive gear may be directly driven by a shaft, indirectly driven by a shaft, driven by a gear, or a combination thereof. The drive gear may be connected to the piston bore, a bearing, or both.

The one or more bearings may function to create a low friction device that rotates the drive gear and/or allows the drive gear to rotate about an axis. The one or more bearings may be a rotational device that rotates a drive gear about an axis. The one or more bearings may function to support one end of a drive gear so that the drive gear is rotatable about an axis. The one or more bearings may function to connect the drive gear to the piston bore. The one or more bearings may allow the drive gear to rotate around an axis, a piston bore axis, a drive shaft axis, or a combination thereof. The one or more bearings may be a thrust bearing, a ball bearing, a roller bearing, a fluid bearing, or a combination thereof. The bearings may include one or more seals that seal the bearing relative to the drive gear, the piston bore, or both.

The one or more seals may function to seal any part of the brake system, the body assembly, or both that includes a fluid, a lubricant, or both. The seals may function to prevent fluid from entering one or more brake components, exiting one or more brake components, or both. The one or more seals may be located between one or more bearings, one or more piston bores, one or more drive gears, one or more drive screws, one or more shafts, one or more transfer gears, one or more gear clusters, or a combination thereof. Preferably, the one or more seals are located between the bearings and the drive screw and/or drive gear. The one or more seals may seal one or more covers that enclose a portion of a brake system, a body assembly, or both.

The one or more covers may function to provide an openable and closeable opening into the brake system, the body assembly, or both. The one or more covers may provide access to one or more gears, one or more connection points, one or more bearings, fluid, or a combination thereof. The one or more covers may seal all or a portion of the body assembly. The one or more covers may retain fluid within the body assembly. Preferably, the one or more covers may provide access to one or both ends of a shaft, an inboard side of the shaft, an outboard side of the shaft, or any point therebetween.

The one or more shafts may function to provide energy such as power, torque, movement, rotation, or a combination thereof from an inboard side to an outboard side of a body assembly, between pistons, between transfer gears, between gears, between a side gear and a shaft gear, or a combination thereof. The one or more shafts may function to rotate one or more gears (i.e., a gear cluster) of the brake system so that a friction force is created. The one or more shafts may extend longitudinally along the body assembly, laterally along the body assembly, or both. The one or more shafts may assist in moving the pistons to create a friction force. For example, one shaft may include two or more gears that may assist in axially moving the inboard piston and the outboard piston in creating a friction force. Preferably, each shaft may more one piston. For example, in order to move two pistons the brake assembly may include two shafts so that the two pistons may be moved in separately, in tandem, or both. A single shaft may move two pistons. For example, a shaft may include two transfer gears and each transfer gear may be in communication with a piston assembly so that two piston assemblies are actuated by the single shaft. The shaft may be one continuous shaft that extends from a first region of the body assembly to second region of the body assembly. For example, one solid shaft may extend from a gear cluster, a differential, a motor, or a combination thereof located on an outboard side to a gear, a shaft, a piston, a drive gear, or a combination thereof located on an inboard side of the body assembly. Two or more shafts may used to create a braking force. Two or more shafts may extend from the differential assembly. Two or more concentric shafts, coaxial shafts, or both from extend from the differential assembly, through all or a portion assembly, from a motor, from an inboard location towards an outboard location or vice versa, or a combination thereof. When more than one shaft is present the shafts may all rotate in the same direction. The shafts may rotate in different directions. The brake system may be free of concentric shafts, coaxial shafts, or both. The brake system may include opposing shafts. Two or more opposing shafts may extend from the differential assembly. The shafts may extend from the differential assembly and may operate independently of each other. The shaft may be solid. The shaft may be hollow one shaft may extend fully and/or partially through another shaft. The shaft may be comprised of a plurality of interconnected shafts that extend from a first region to a second region. The shaft may extend along a plane, may include one or more universal joints so that the shaft may include curvature, or a combination of both. The shaft may include one or more gears, one or more geared portion, one or more rotation devices, or a combination thereof.

The body assembly, the shaft, the differential, the gear cluster, or a combination thereof may include one or more gears and preferably a plurality of gears. The gears may function to provide energy (e.g., torque, power, rotation, movement, or a combination thereof) from one device to an adjacent device so that movement is facilitated. The gears as discussed herein may create a connection between two or more devices so that energy is transferred between the two or more devices. The gears may be a cog, a sprocket, a belt, a chain, a worm gear, a spur gear, a miter gear, a toothed device, intermeshing pieces, a helical portion, or a combination thereof. Preferably, the gears are two or more toothed devices that include intermeshing teeth that provide energy from one device to the other device. The shaft may include a gear in both end regions (i.e., a shaft gear). The shaft may include shaft shat gears on both ends. The shaft may include a shaft gear on one end and connect to the differential assembly on a second end. The shaft may include one or more transfer gears. The shaft may include a shaft gear on one side and an outer side gear (i.e., a gear of the differential assembly) on the opposing end.

The one or more gears may be a shaft gear, an outer side gear, a gear cluster, a transfer gear, an outer drive gear, a gear of a differential, a ring gear, or a combination thereof. The one or more shaft gears, the one or more outer side gears, or both may be any gear that connects a shaft to a drive gear so that a pushing portion is axially moved. The one or more shaft gears may be connected to a shaft that extends from a differential. The one or more shaft gears may be located on a one or r both ends of a shaft that extends directly from a differential. The one or more shaft gears may be located on one or both end regions of a shaft. The one or more shaft gears may connect to and transfer energy to one or more drive gears, one or more transfer gears, or both. The one or more shaft gears may directly provide power to a location of interest. The one or more shaft gears may indirectly provide power to a location of interest. One of the one or more shaft gears may be part of a differential (e.g., a side gear or a pinion gear).

One of the gears may be a transfer gear that is located between a shaft (e.g., shaft gear) and a drive gear so that energy is transferred from the shaft to a drive gear and then the drive screw is axially moved. The one or transfer gears may function to translate energy between two spaced apart gears, locations, or both. The one or more transfer gears may assist in extending power longitudinally, laterally, or both along the body assembly. The one or more transfer gears may function to step up torque, step down torque, step up speed, step down speed, or a combination thereof generated by the motor, the differential, or both so that a sufficient braking force may be created below a predetermined time as is discussed herein. The one or more transfer gears may be configured so that the length of the shaft is reduced by the length of a gear, so that packaging space required by the piston assemblies is reduced, or both (relative to an assembly with no transfer gears). The one or more transfer gears may be free of a fixed connection with an end region of the shaft, may be in rotational connection with an end region of a shaft, or both. The one or more transfer gears may function to form a stack of one or more gears between the shaft and the drive screw. The one or more transfer gears may be part of a gear cluster that transfers energy from a motor so that a friction force is created.

The one or more gear clusters may function to transfer energy to an inboard side, an outboard side, or both individually, in unison, or both. The one or more gear clusters may allow one piston to be actuated and one piston to remain stationary. The one or more gear clusters may allow both pistons to be actuated simultaneously. The one or more gear clusters may function to transfer energy from a differential to one or both pistons, from a motor to one or more pistons, or a combination thereof. The one or more gear clusters may transfer energy from a shaft to a drive gear, a drive screw, or both. The one or more gear clusters may step up torque, step down torque, step up rotation speed, step down rotation speed, or a combination thereof to create a braking force with a predetermined amount of time. The one or more gear clusters may drive a shaft, an outer drive gear, or both in unison, individually, or both.

The outer drive gear may function to move one piston individually of a second piston. The outer drive gear may function to connect two pistons to a differential and allow the pistons to be actuated individually, in unison, or both. The outer drive gear may extend around a shaft, may extend through a hollow shaft, or both. The outer drive gear may directly and/or indirectly transfer energy from a differential to a drive gear. The outer drive gear may drive a drive gear that is in communication with the drive screw, the pushing portion or both. A side of the outer drive gear may be part of a differential. The outer drive gear may include an outer side gear, which may be aside gear of a differential.

The differential may function to provide energy to one or both of the pistons so that the pistons create a friction force. The differential may function to actuate the pistons individually, in unison, or both. The differential may function to evenly actuate two or more pistons, evenly distribute power between two or more pistons, or both. The differential may function to create a braking force by moving two or more pistons with a single motor. The differential may alternate a power supply between two or more pistons, may distribute power between two or more pistons, or both. The differential may be an epicyclic differential, a spur gear differential, a miter gear differential, or a combination thereof. The differential may function to transfer power to the piston assemblies based upon the resistance received at the differential. The differential may function to stop transferring energy to a piston assembly when resistance increases and divert additional energy to the piston assembly with a lower resistance so that the energy supplied to the piston assembly with the lower resistance is increased by a factor of 1.5 or more or 2 or more. The differential may alternate transferring power to the piston assemblies depending on which piston assembly exhibits the least resistance during movement of the piston assemblies to create a friction force. For example, the differential may assist in moving both piston assemblies simultaneously until a resistance on one side increases and then the differential will transfer all of the energy to the piston assembly with the lower resistance so that the lower resistance piston is moved twice as fast as when both assemblies are actuated. The differential will alternate and/or simultaneously transfer energy to the piston assemblies until a predetermined friction force is created. The differential may transfer power to the piston assemblies via rotating one or more side gears, rotating the entire differential assembly, or both.

The side gears may function to transfer energy to one or both piston assemblies to create friction force. The side gears may function to rotate a shaft, an outer drive gear, or both. The side gears may transfer power from a motor to a shaft, an outer drive gear, or both. The side gears may both rotate about the same axis. The side gears may oppose each other. For example, the side gears may be located in a housing and the side gears may be located on opposite sides of the housing. The side gears may be free of direct contact with each other. The side gears may be movable independently of each other. The side gears may be in communication via one or more pinion gears and preferably a plurality of pinion gears that extend between and contact one or both of the side gears.

The pinion gears may function to allow the side gears to move independently of each other. The pinion gears may function to allow one side gear to rotate and one side gear to remain static while a differential housing rotates, a motor rotates one side gear, or both. The pinion gears may function to rotate with the side gears in unison until the resistance of or the piston assemblies overcomes a friction force between the pinion gears and the side gears. The pinion gears and side gears may be located within, held in communication, protected by, or a combination thereof a housing.

The housing may function to hold the side gears and pinion gears in communication. The housing may be static. The housing may rotate about an axis so that energy is transferred to one or both side gears and then to one or both piston assemblies. The housing may connect a differential to a shaft, a motor, a body assembly, or a combination thereof. The housing may be rotated around an axis by the motor or by the motor actuating a ring gear.

The one or more ring gears may function to rotate the housing, the differential assembly, or both. The one or more ring gears may provide power to one or more pinion gears, to one or more side gears, or both. The one or more ring gears may rotate the entire housing, the entire differential assembly, or both. The ring gear may rotate independent of the housing. The one or more ring gears may provide communication between a motor, a drive shaft, or both and the differential assembly.

The motor may function to provide energy to one or more devices so that friction force is generated. The motor may function to directly and/or indirectly move one or more piston assemblies. The motor may function to actuate the one or more brake pads by a hydraulic force, an electric drive, a pneumatic drive, or a combination thereof.

Figure 1:
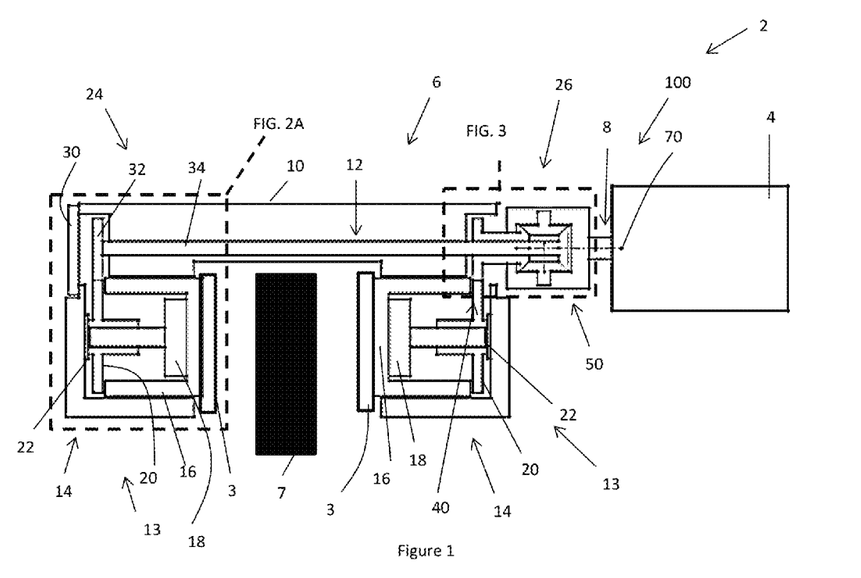
FIG. 1 illustrates a side view of an example of a brake assembly including an electric park brake.

FIG. 1 illustrates a brake system 2. The brake system 2 includes an electric park brake system 100 including a motor 4 connected to a body assembly 6 by a differential assembly 50 and a gear cluster 40. An axis 70 runs through the differential assembly 50 along a shaft 34. A drive shaft 8 extends from the motor 4 to the differential assembly 50. The differential assembly 50 transfers energy to the gear cluster 40. The gear cluster 40 and differential assembly 50 transfer energy to an inboard side 26 and an outboard side 24 independently. The outboard side 26 includes a piston assembly 13 comprising a piston bore 14 that houses a piston 16 and gearing for moving the piston 16. The gearing includes a drive screw 18 that is in contact with a rear side of the piston 16. The drive gear 20 is in communication with a bearing 22 and rotates about an axis moving the drive screw 18 along its axis so that the drive screw 18 moves the piston 16. The drive gear 20 is driven by a gear of the gear cluster 40. The gear cluster 40 is also in communication with a shaft 34 that extends through a bridge bore 12 in the bridge 10 from the inboard side 26 to the outboard side 24. The outboard side 24 of the shaft 34 is in communication with a gear 32. The gear 32 transfers energy to a drive gear 20 that rotates via a bearing 22 The drive gear 20 moves a drive screw 18 that pushes the piston 16 and respective brake pad 3 on the outboard side 26 towards the piston 16 and respective brake pad 3 on the inboard side 26 so that a friction force is created on a rotor 7. An end of the shaft 34 at the outboard side 24 and associated gear 32 are protected by a cover 30 that seals a portion of the piston bore assembly 13 including the piston bore 14 so that fluid may be used to create a braking force during normal braking conditions.

Figure 2A:
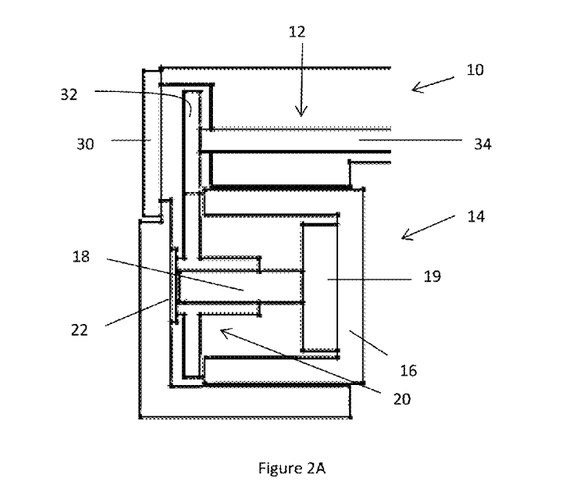
FIG. 2A illustrates close-up view of an outboard side of the brake assembly of FIG. 1.

FIG. 2A illustrates a close up view of an outboard side piston bore 14 and gearing of FIG. 1. A shaft 34 is shown extending through a bridge bore 12 that extends through the bridge 10. The end of the shaft 34 includes a gear 32 that is in communication with a drive gear 20 and the gear 32 and drive gear 20 are sealed behind a cover 30. The drive gear 20 rotates via a bearing 22 so that a pushing portion 19 of a drive screw 18 moves a piston 16 towards the inboard side (not shown) to create a parking force.

Figure 2B:
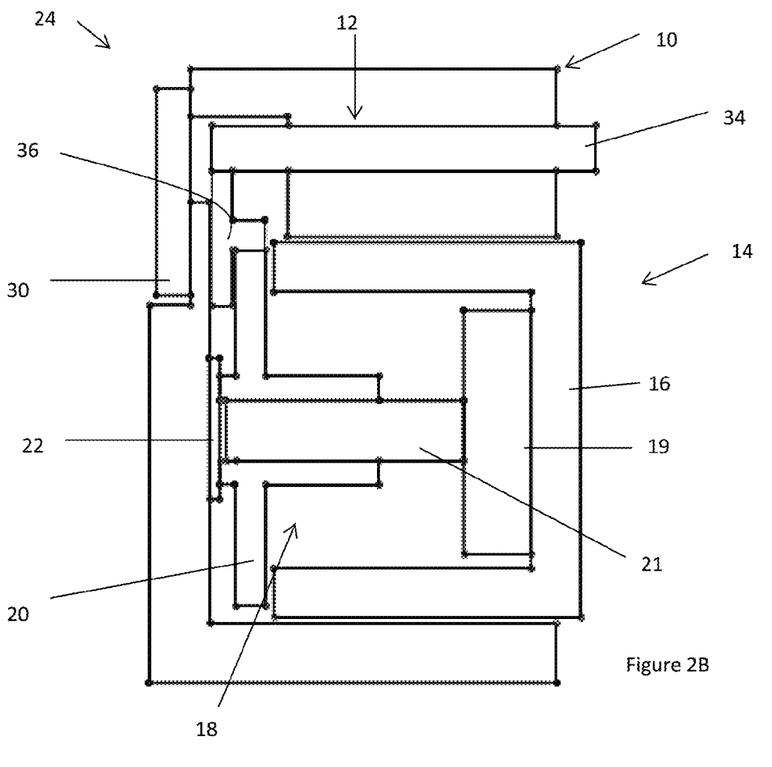
FIG. 2B illustrate a close-up view of an inboard side of the brake assembly of FIG. 1.

FIG. 2B illustrates a close-up view of an example of an outboard side 24 piston bore 14 and gearing. A shaft 34 is shown extending through a bridge bore 12 that extends through the bridge 10. The end of the shaft 34 is in communication with a transfer gear 36 that is in communication with a drive gear 20 and the transfer gear 36 and drive gear 20 are sealed behind a cover 30. The drive gear 20 rotates via a bearing 22 around an elongated portion 21 of the drive screw 18 so that a pushing portion 19 of the drive screw 18 moves a piston 16 towards the inboard side (not shown) to create a friction force.

Figure 3:
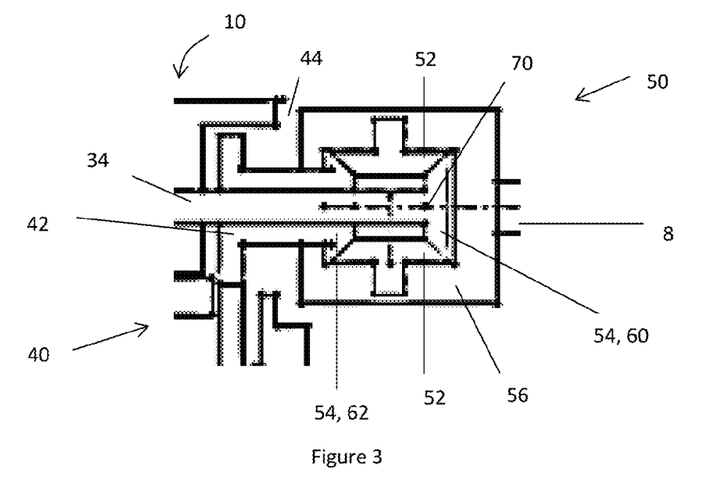
FIG. 3 illustrates a close-up view of a gear cluster and a differential assembly.

FIG. 3 illustrates a close-up view of a gear cluster 40 of FIG. 1. The gear cluster 40 includes the shaft 34 running from the outboard side to the inboard side so that energy is transferred to gearing on the outboard side. The shaft 34 extends along an axis 70 through an outer drive gear 42 that transfers energy to gearing on the inboard side. The shaft 34 and the outer drive gear 42 are rotatable independently of one another so that the shaft 34 and outer drive gear 42 may be in rotated independently, in unison, or both. Both the shaft 34 and the outer drive gear 42 are partially sealed within the bridge 10 by a seal 44. A shaft 8 extending from the motor (not shown) through a housing 56 of the differential assembly 50. The differential assembly 50 includes a plurality of pinion gears 52 that are located between a pair of side gears 54. One side gear 54 is a shaft gear 60 that rotates the shaft 34 and one side gear 54 is an outer side gear 62 for driving the outer drive gear 42.

Figure 4:
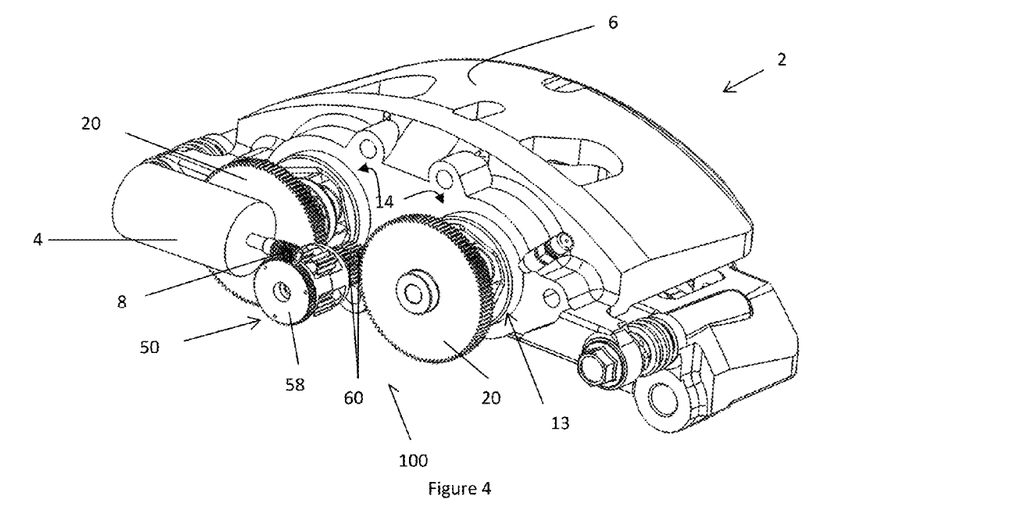
FIG. 4 illustrates a perspective view of a brake assembly including a motor and an electric park brake system.

FIG. 4 illustrates a brake system 2 including an electric park brake system 100 with a motor 4 connected to the electric park brake system 100. The brake system 2 includes a body assembly 6 with a pair of adjacent piston bores 14. Each piston bore 14 includes a piston assembly 13 that is connected to a drive gear 20 which moves a drive screw (not shown) so that the piston (not shown) is moved within the piston bore 14. Each drive gear 20 is in communication with a shaft gear 60 that individually drives each of the drive gears 20. Each of the shaft gears 60 extend from and are connected to the differential assembly 50 and the differential assembly is driven by a ring gear 58 that is in communication with the motor 4 via a drive shaft 8 that includes a worm gear.

Figure 5:
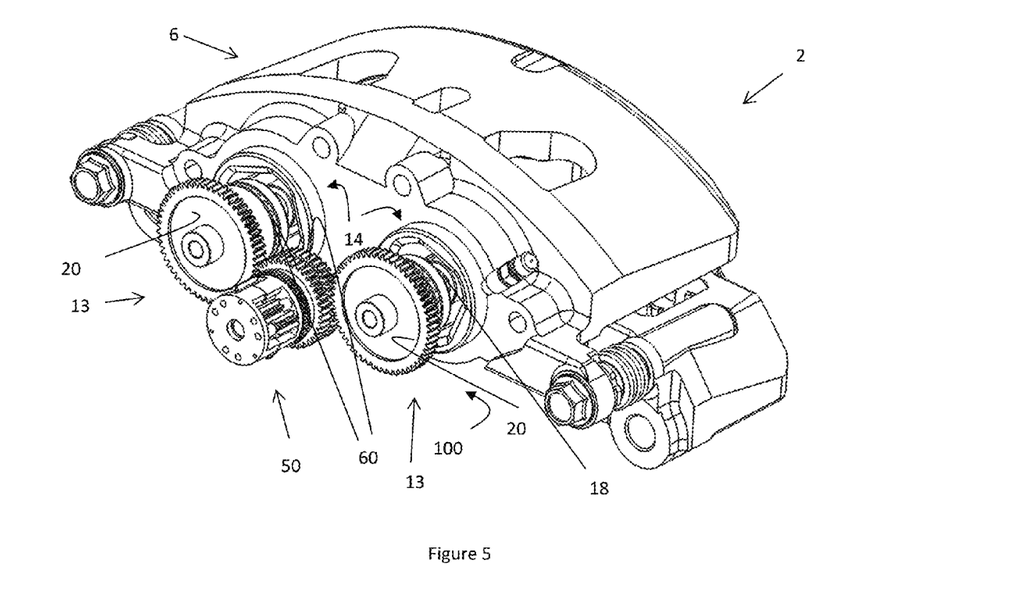
FIG. 5 illustrates a perspective view of a brake assembly including an electric park brake system.

FIG. 5 illustrates a brake system 2 including an electric park brake system 100 with the motor removed. The brake system 2 includes a body assembly 6 having a piston assembly 13 with a pair of adjacent piston bores 14. Each of the piston bores 14 include a piston (not shown) that is moved by a drive screw 18 when a drive gear 20 moves the drive screw 18. The drive gears 20 are each in communication with a shaft gear 60 and each shaft gear 60 individually moves a drive gear 20 so that the pistons (not shown) are individually moved. A differential assembly 50 (which is a spur gear differential as shown) moves each of the shaft gears 60 individually.

Figure 6:
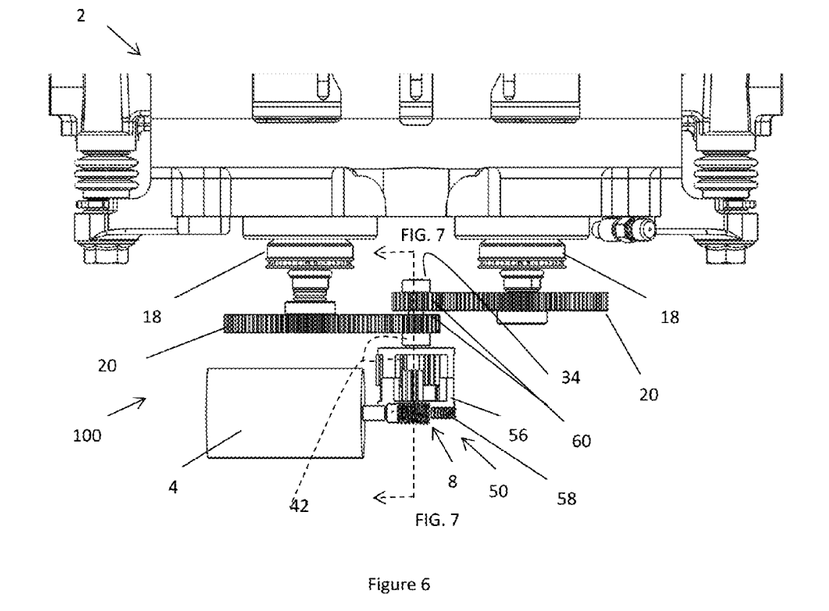
FIG. 6 illustrates top view of the brake assembly of FIG. 4.

FIG. 6 illustrates a brake system 2 including an electric park brake system 100. The electric park brake system 100 includes a motor 4 with a drive shaft 8 having a worm gear that is in communication with a ring gear 58, which supplies power to the differential assembly 50. The ring gear 58 rotates the differential assembly 50 so that the gears within the housing 56 are rotated. The differential assembly 50 includes an outer drive gear 42 with a shaft 34 that extends through the outer drive gear 42 that is partially located within the differential assembly 50 and partially extends out of the differential assembly 50, and both the outer drive gear 42 and the shaft 34 are in communication with shaft gears 60 for supplying power to the adjacent pistons. Each of the shaft gears 60 is in communication with a drive gear 20, and each drive gear 20 rotates a drive screw 18 to move a piston (not shown) axially to create a braking force or to remove a braking force.

Figure 7:
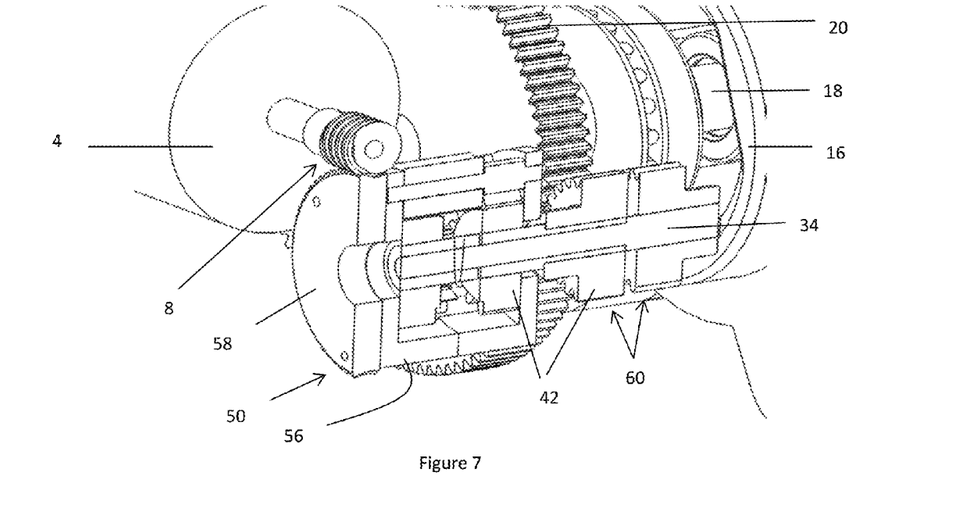
FIG. 7 illustrates a cross sectional vies of a differential of the electric park brake system of FIG. 6.

FIG. 7 illustrates a cross-sectional view of differential assembly 50 of FIG. 6. The differential assembly 50 includes a housing 56 that is connected to a ring gear 58. The ring gear 58 is in communication with a drive shaft 8 with a worm gear (although other types of gears may be used) that extends from a motor 4 so that the ring gear 58 is moved by the motor 4. A pair of shaft gears 60 are in communication with the differential assembly 50 by an outer drive gear 42 that extends around a shaft 34 so that the shaft gears 60 can be moved individually. Each of the shaft gears 60 is in communication with a drive gear 20 that moves a drive screw 18 and axially moves a piston 16 within a piston bore to create a braking force.

Figure 8:
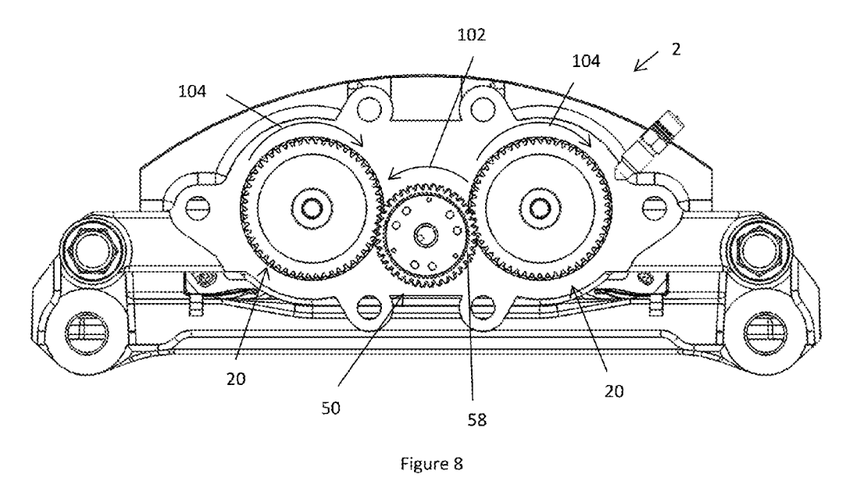
FIG. 8 illustrates an inboard view of the brake assembly of FIG. 5

FIG. 8 illustrates an end view of the brake system 2 of FIG. 5. The brake system 2 includes a differential assembly 50 that is connected to a ring gear 58. The ring gear 58 rotates in the direction 102 to create a braking force so that each of the two opposing drive gears 20 rotate in the direction 104 and move the drive screw and piston axially to create a parking brake force.

Figure 9:
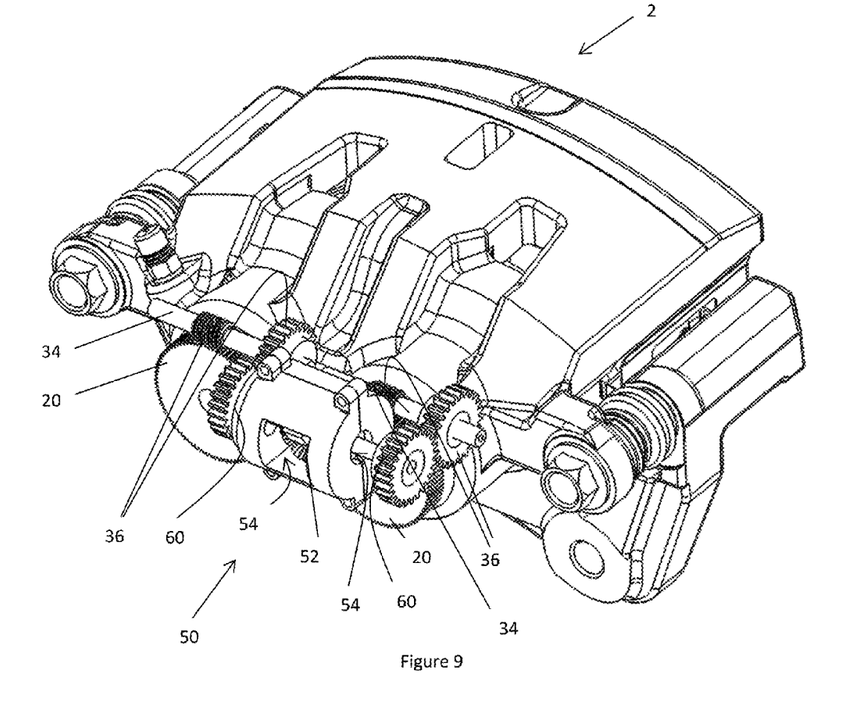
FIG. 9 illustrates a perspective view of a brake assembly including an electric park brake system.

FIG. 9 illustrates a brake system 2 including a differential assembly 50 that is a miter gear differential as illustrated. The differential assembly 50 includes a plurality of gears including pinion gears 52 and side gears 54 in communication with the pinion gears 52. The side gears 54 include a shaft gear 60 one side that is in communication with a transfer gear 36. Two transfer gears 36 are connected together by a shaft 34 so that power is transferred from the shaft gear 60 through the transfer gears 36 and to the drive gear 20 for axially moving a piston (not shown). The transfer gear 36 that is in communication with the drive gear 20 is a worm gear.

Figure 10:
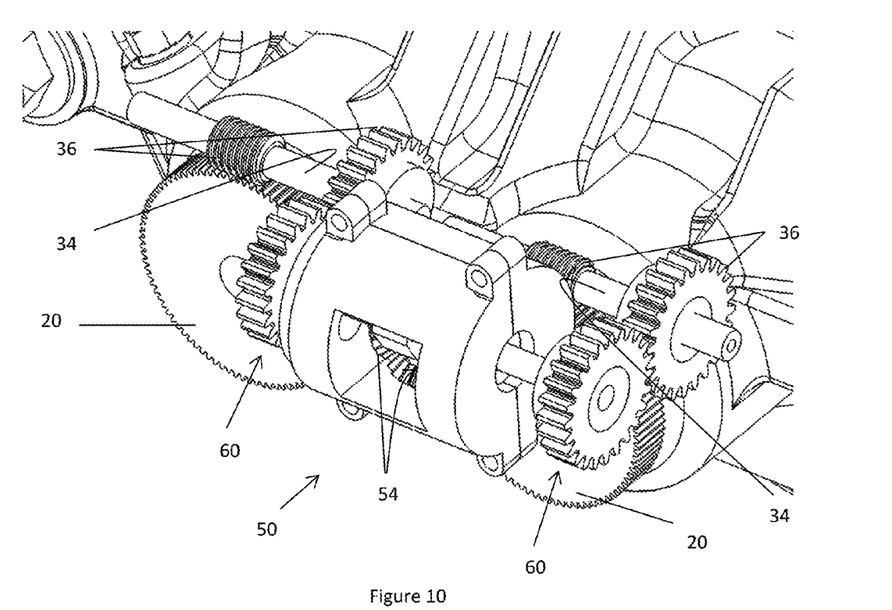
FIG. 10 illustrates a close up view of the electric park brake system of FIG. 9.

FIG. 10 illustrates a close up view of the differential assembly 50. A pair of aide gears 54 and shaft gears 60 extend from each side of the differential 50. Each of the shaft gears 60 are in communication with a transfer gear 36 at a first end of a shaft 34 that rotates a transfer gear 36 at a second end of the shaft 34 so that power is transferred to a drive gear 20 to move a piston (not shown).

Figure 11:
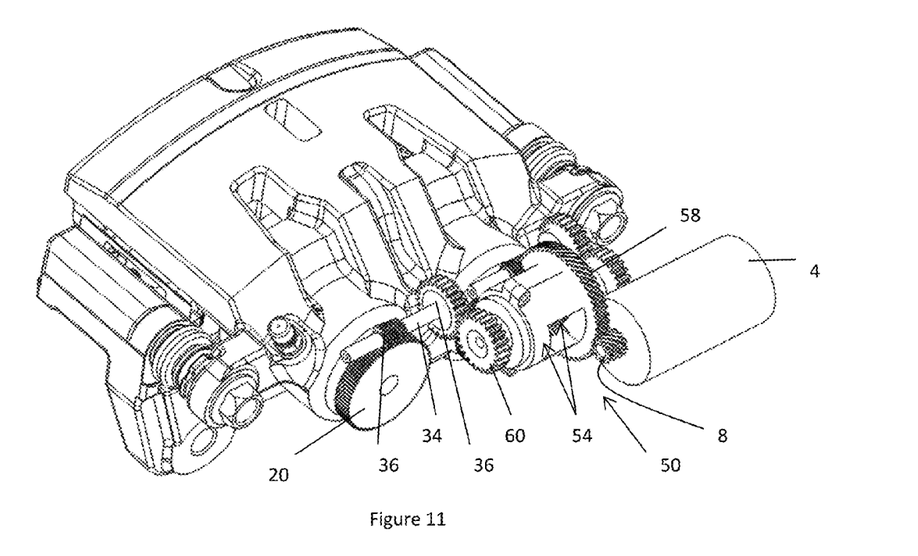
FIG. 11 illustrates a top perspective view of an electric park brake system and motor in communication with a brake assembly.

FIG. 11 illustrates a perspective view of a differential assembly 50. The differential assembly 50 includes a motor 4 with a drive shaft 8 in communication with a ring gear 58. The ring gear 58 supplies power that is split between a pair of opposing side gears 54 that are connected to shaft gears 60. The power from the motor 4 is diverted to the side gear 54 and the shaft gear 60 with the least amount of resistance so that power is equally distributed to each of the transfer gears 36 and ultimately the pistons (not shown) to create a parking brake force. The shaft gears 60 are in communication with a transfer gear 36 on a first end of a shaft 34 and then power is transferred through the shaft to a transfer gear 36 on a second end of the shaft 34 where the transfer gear 36 rotates the drive gear 20 that moves a piston (not shown) axially.

Figure 12:
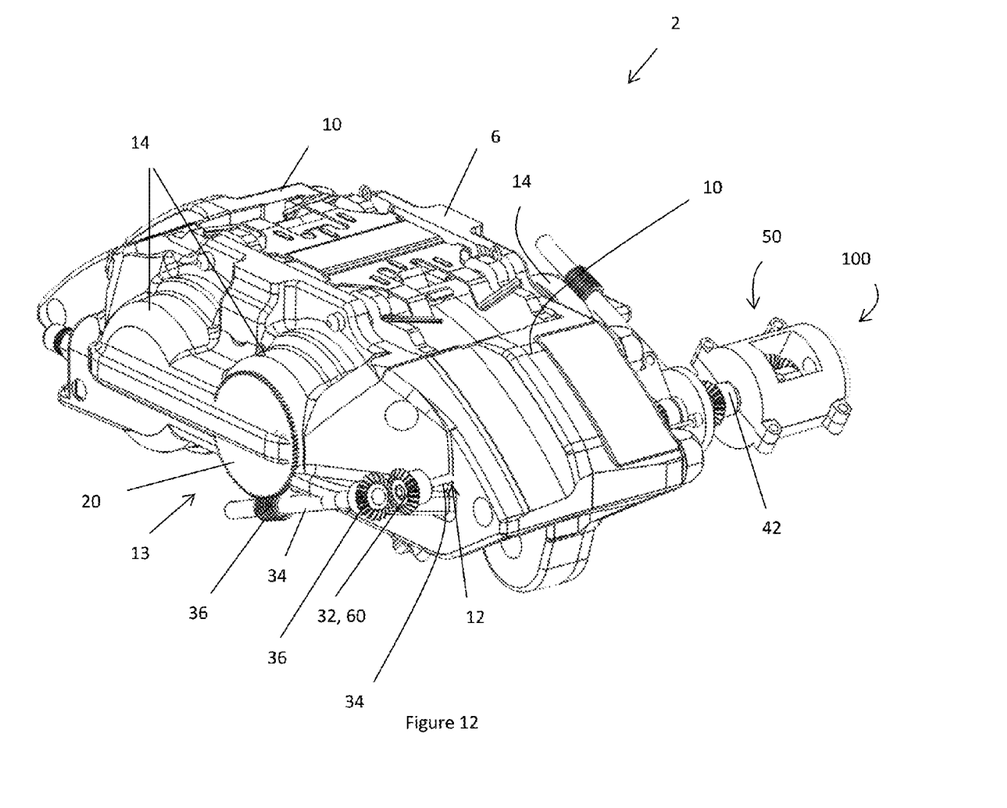
FIG. 12 a perspective view of a brake system including an electric park brake.

FIG. 12 illustrates a perspective view of a brake system 2 including an electric park brake system 100. The brake system 2 includes a body assembly 6 having a pair of opposing bridges 10. The bridge 10 proximate to the electric park brake system 100 includes a bridge bore 12 that extends between the inboard side and the outboard side of the body assembly 6. Both the inboard side and the outboard side of the body assembly 6 include a pair of adjacent piston bores 14. Each of the piston bores 14 include a piston assembly 13 that assists in creating a braking force and a parking brake force. A differential assembly 50 is connected to one end of the body assembly 6 and includes an outer gear drive 42 that drives a piston assembly on a first side (e.g., the inboard side as illustrated) and a shaft 34 extends through the outer gear drive 42 from the first side to a second side (e.g., the outboard side as illustrated). The shaft 34 on the second side includes a gear 32 which as illustrated is a shaft clear 60 that provides power to a transfer gear 36 on a first end of a shaft 34 so that the shaft is rotated and a transfer gear 36 on a second end of the shaft 34 rotates a drive gear that moves the piston assembly 13 to create a parking brake force. As illustrated, only one piston assembly on each side is actuated by the electric park brake assembly, however, the both pistons may be actuated by the electric park brake system to create a parking brake force.

Figure 13:
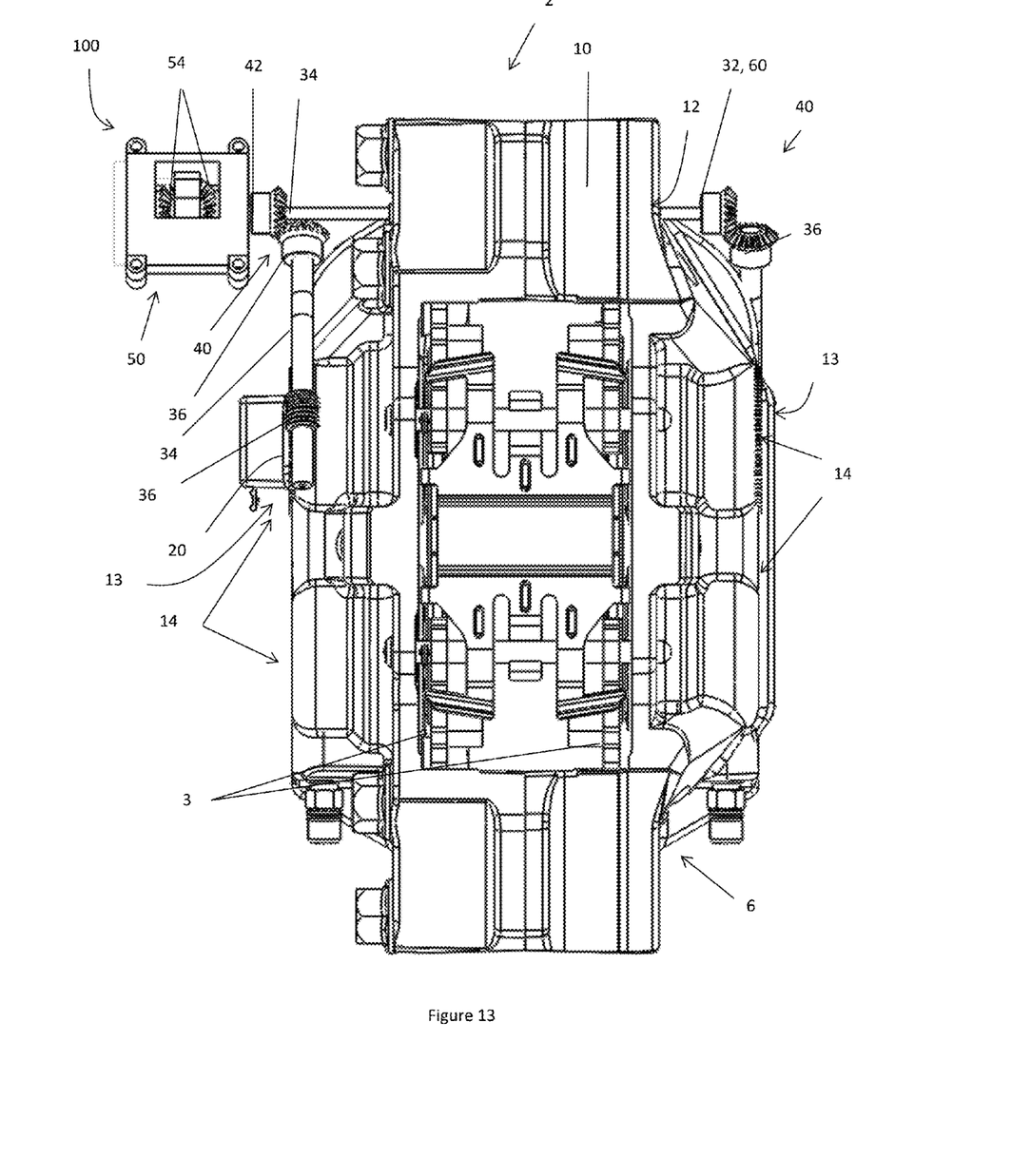
FIG. 13 illustrates a top view of the brake system of FIG. 12.

FIG. 13 illustrates a top view of a brake system 2 and electric park brake system 100 of FIG. 12. The brake system 2 includes a body assembly 6 having bridges 10 at opposing ends and a pair of brake pads 3 located within the body assembly 6. As illustrated, the electric park brake system 100 is located at one end of the brake system 2. The electric park brake system 100 includes a differential assembly 50 with an outer drive gear 42 connected to a first side gear 54 and a shaft 34 connected to and extending from a second side gear 54 and through the outer drive gear 42. The shaft 34 extends from the differential assembly 50 on a first side of the body assembly 6 through a bridge bore 12 in the bridge 10 to a second side of the body assembly 6. The shaft 34 includes a gear 32, which is configured as a shaft gear 60, that is in communication with a transfer gear 36, which transfers power to a piston assembly 13 within a piston bore 14. The transfer gear 36 and the shaft gear 60 form a gear cluster 40 that transfers power between two locations. The shaft 34 can rotate independently of the outer drive gear 42 or in unison with the outer drive gear 42 or vice versa. The outer drive gear 42 is powered by a first side gear 54 and the outer drive gear 42 is in communication with a transfer gear 36 at a first end of a shaft 36 forming a gear duster 40. The second end of the shaft 34 includes a transfer gear 36 (which is shown as a worm gear). The transfer gear 36 at the send end of the shaft 34 is in communication with a drive gear 20 that is in communication with a piston assembly 13 so that the piston assembly 13 is moved within the piston bore 14.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

We claim:

1. A method of creating a parking brake force, the method comprising:
providing power equally to two or more piston assemblies so that each of the piston assemblies are moved in unison until a resistance of one of the piston assemblies becomes higher than a remainder of the piston assemblies, and
transferring power with a differential assembly from the piston assembly with the higher resistance to the remainder of the piston assemblies with a lower resistance so that the piston assembly with the higher resistance ceases to move and additional power is supplied to the remainder of the piston assemblies,
wherein the power is provided by an electric brake assembly, which is part of a hydraulic brake system that provides a braking force, and
wherein the differential assembly is located between a first drive gear and a second drive gear, the first drive gear is in communication with one of the piston assemblies, and the second drive gear is in communication with another one of the piston assemblies.

2. The method of claim 1, wherein the electric brake assembly includes two or more shafts that extend from the differential assembly, and each one of the shafts is in communication with a respective one of the two or more piston assemblies.

3. The method of claim 2, wherein the two or more shafts extend from opposing sides of the differential assembly.

4. The method of claim 3, wherein one or more transfer gears are located between one or more of the two or more piston assemblies and one or more of the two or more shafts so that the power is indirectly provided from the differential assembly to the one or more of the two or more shafts through the one or more transfer gears and to the one or more of the two or more piston assemblies.

5. The method of claim 2, wherein one or more transfer gears are located between one or more of the two or more piston assemblies and one or more of the two or more shafts so that the power is indirectly provided from the differential assembly to the one or more of the two or more shafts through the one or more transfer gears and to the one or more of the two or more piston assemblies.

6. The method of claim 1, wherein the first drive gear extends from the differential assembly and provides the power to a first piston assembly, and
wherein a shaft extends from differential assembly through the first drive gear to provide the power from the differential assembly to a second piston assembly, and
wherein the first drive gear and the shaft are concentric.

7. The method of claim 6, wherein all of the two or more piston assemblies are located on an inboard side of a brake caliper.

8. The method of claim 1, wherein at least one of the two or more piston assemblies are located on an outboard side of a body assembly and at least one of the two or more piston assemblies are located on an inboard side of the body assembly.

9. The method of claim 1, wherein all of the two or more piston assemblies are located on an inboard side of a brake caliper.

10. The method of claim 1, wherein each of the two or more piston assemblies include a piston and a drive screw that moves the piston when the electric brake assembly provides the power to the two or more piston assemblies during the providing step, and
wherein the drive screw includes a pushing portion that is connected to an elongated portion, and the elongated portion includes threads that axially move the drive screw and the piston to create the parking brake force.

11. The method of claim 1, wherein the differential assembly is a spur gear differential that includes a plurality of spur gears.

12. The method of claim 1, wherein the differential assembly comprises:
  i. a first shaft extending directly from the differential assembly,
  ii. a first shaft gear located at an end of the first shaft;
  iii. a second shaft extending directly from the differential assembly,
  iv. a second shaft gear located at an end of the second shaft;
  wherein the first shaft gear connects the first shaft to the first drive gear, and the second shaft gear connects the second shaft to the second drive gear.

13. A brake system comprising:
  a. a body assembly comprising:
    i. a first piston assembly; and
    ii. a second piston assembly;
    iii. an outboard side;
    iv. an inboard side; and
    v. a bridge extending between and connecting the inboard side and the outboard side,
    wherein the first piston assembly and the second piston assembly are located entirely on the outboard side, entirely on the inboard side, or one of the first piston assembly and the second piston assembly is located on the inboard side and the other of the first piston assembly and the second piston assembly is located on the outboard side,
  b. an electric brake assembly comprising:
    i. a differential assembly;
    ii. a first shaft extending directly from the differential assembly into communication with the first piston assembly via a first drive gear;
    iii. a second shaft extending directly from the differential assembly into communication with the second piston assembly;
  wherein the differential assembly provides power equally to both of the first piston assembly and the second piston assembly so that both the first piston assembly and the second piston assembly are moved in unison until a resistance of one of the piston assemblies becomes higher than the other piston assembly, and the differential assembly then transfers the power from the piston assembly with the higher resistance to the piston assembly with a lower resistance so that the piston assembly with the higher resistance ceases to move and the power is supplied to the piston assembly with the lower resistance.

14. The brake system of claim 13, wherein the differential assembly includes one or more spur gears.

15. The brake system of claim 13, wherein the first shaft includes a first shaft gear that is in communication with the first drive gear, and the second shaft includes a second shaft gear that is in communication with the second drive gear.

16. The brake system of claim 13, wherein each of the first piston assembly and the second piston assembly include a piston and a drive screw that moves the piston when the electric brake assembly provides the power, and
wherein the drive screw includes a pushing portion that is connected to an elongated portion and the elongated portion includes threads that axially moves the drive screw and the piston to create the parking brake force.

17. The brake system of claim 13, wherein the electric brake assembly is part of a hydraulic brake system that provides a braking force.

18. The method according to claim 13, wherein the first piston assembly and the second piston assembly are located on an inboard side of the body assembly.

19. A method of creating a brake force the method comprising steps of:
  providing power equally to a first piston assembly and a second piston assembly with a differential assembly so that both of the of the first piston assembly and the second piston assembly move in unison until resistance of one of the piston assemblies becomes higher than a resistance of the other piston assembly,
  transferring the power with the differential assembly from the piston assembly with the higher resistance to the piston assembly with a lower resistance so that the piston assembly with the higher resistance ceases to move while the power is supplied to the piston assembly with the lower resistance,
  wherein the differential assembly is located between a first drive gear and a second drive gear, the first drive gear is in communication with the first piston assembly, and the second drive gear is in communication with the second piston assembly.

20. The method according to claim 19, wherein the first piston assembly and the second piston assembly are located entirely on an inboard side of the body assembly.

* * * * *

UNITED STATES PATENT AND TRADEMARK OFFICE
CERTIFICATE OF CORRECTION

PATENT NO. : 9,879,739 B2
APPLICATION NO. : 15/140689
DATED : January 30, 2018
INVENTOR(S) : Kenneth Eric Gutelius et al.

It is certified that error appears in the above-identified patent and that said Letters Patent is hereby corrected as shown below:

In the Claims

Column 17, Line 6: insert --the-- before "differential"

Column 17, Line 48: delete "and" after "assembly;"

Signed and Sealed this
Fifteenth Day of May, 2018

Andrei Iancu
*Director of the United States Patent and Trademark Office*